R. Lissenbee,

Watchmaker's Lathe,

Nº 53,994. Patented Apr. 17, 1866.

Witnesses
Alex. A. C. Klauckle
W. F. Hall

Inventor
Robert Leissenbee

UNITED STATES PATENT OFFICE.

ROBERT LISSENBEE, OF GREENEVILLE, TENNESSEE.

IMPROVED PIVOT-LATHE.

Specification forming part of Letters Patent No. 53,994, dated April 17, 1866.

*To all whom it may concern:*

Be it known that I, ROBERT LISSENBEE, of Greeneville, in the county of Greene and State of Tennessee, have invented a new and useful Improvement in Lathes for Watch-Makers' Uses; and I do hereby declare the following to be a full and exact description thereof, reference being had to the annexed drawings, making part of this specification, in which—

Figure 1:
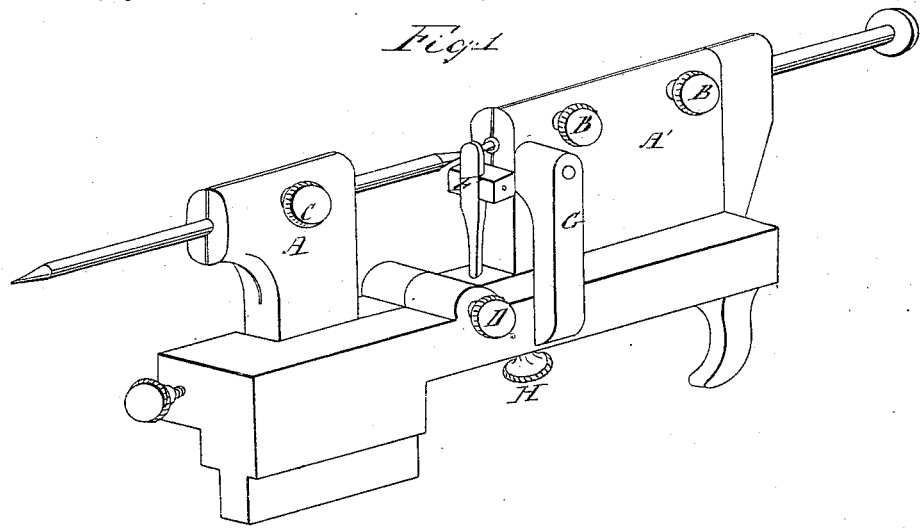
Figure 2:
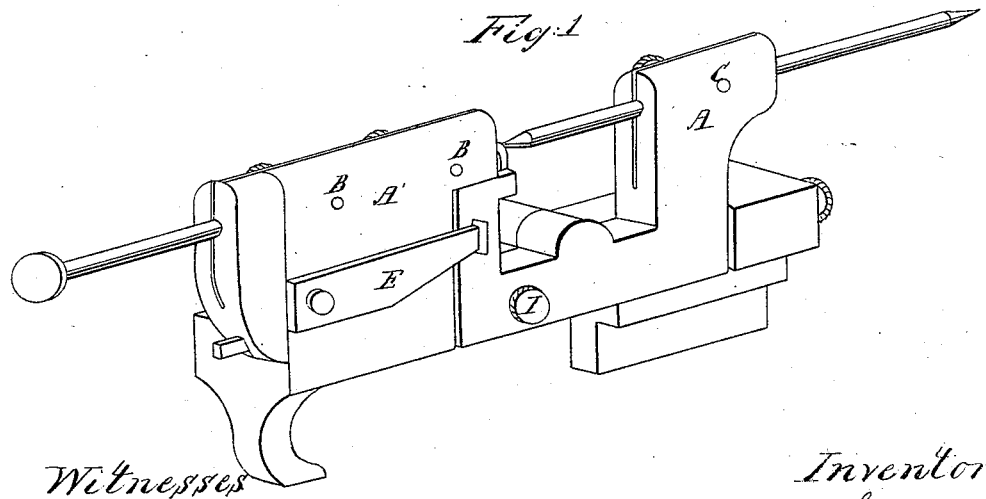

Figures 1 and 2 are perspective views of my improved lathe from opposite sides of the same.

The nature of my invention consists in so constructing a watch-maker's pivot-lathe as to obviate all the difficulties arising from the breaking of pivots when cut or turned in the lathe by a file, as is the case with all that have been hitherto made, and from defective workmanship caused by dependence on the accuracy of the hand or eye when these have become impaired or infirm.

I construct the heads A A' of my lathe in the ordinary manner and of the common form, with the addition of splitting them down through the channels, for the centers and tool-holders, lengthwise, or in a perpendicular plane passing through the axis of the centers to a short distance below the line of centers, for the purpose of allowing the centers and tool-holders to pass more readily into their bearings, when they may be tightened by set-screws B B C.

The heads A A' are also separate from and independent of each other, so that the head A', which receives the tool, can be moved laterally, in order that its center may be in a vertical plane parallel to, but not passing through, the center of the head A. This adjustment is effected by means of the screw D, which, when turned in, forces the stocks of the heads apart, while a spring, E, brings them together when the screw is turned out.

Instead of using a file for the turning-tool, as has been the case with all watch-makers when making pivots, I use a tool constructed for the purpose, thereby obtaining a smoother finish and securing the condition that the pivot shall be exactly in the center of the staff or spindle.

After the staff or spindle to be pivoted has been fixed in the collet of the drill-bow it is so placed in the lathe that one end shall be centered properly in the fixed center of the head A and the other end pass through a rest, F, which supports it, to a distance beyond the rest equal to the required length of pivot, the staff or spindle to be pivoted being first turned off at the pivot end to a conical shape, to be received in a countersink in the rest F, to confine the staff between the rest and the center, so that it may not fall.

The tool-holder is secured in the other head, A', by set-screws B B, so as to be firm, while it may at the same time be forced, by pressure of the fingers, to slide evenly along its bearing toward the rest F during the time the workman is using the drill-bow.

The size of the pivot is regulated by the distance the cutting-edge of the tool is set from the center of the pivot by the action of the screw D and spring E.

G is a standard-rest, also adjustable by means of a screw, H, and is intended to receive a burnishing-tool which shall operate in one direction against the pivot after being turned, while another burnishing-tool operates in place of the cutter in the head A'.

The lathe is to be secured to the bench or table by any of the common devices ordinarily in use.

The rest F is adjustable in its height by means of the screw I.

Having thus fully described my invention, what I claim as new therein, and desire to secure by Letters Patent, is—

1. The heads A A' of a watch-maker's pivot-lathe, split as described, in combination with the rest F and the screw D and spring E, whereby the heads may be adjusted laterally, so that their axes may be in different perpendicular planes, as set forth.

2. The adjustable rest G for receiving a burnishing-tool, as set forth, in combination with the heads A A', arranged and operating as described, and in one of which another burnishing-tool may be used at the same time, as described.

ROBERT LISSENBEE.

Witnesses:
W. F. HALL,
ALEXR. A. C. KLAUCKE.